United States Patent

Newman, Sr. et al.

[11] 4,062,256
[45] Dec. 13, 1977

[54] CROSS SLIDE TURNING TOOL HOLDERS

[76] Inventors: William Eugene Newman, Sr., 3114 Harford Road; Paul Donald Newman, 7 Nacelle Road, both of Baltimore, Md. 21218

[21] Appl. No.: 703,832

[22] Filed: July 9, 1976

[51] Int. Cl.² .............................................. B23B 5/38
[52] U.S. Cl. ..................................... 82/17; 82/24 R; 29/57
[58] Field of Search ............... 82/24 R, 17, 16, 12; 29/57, 57 A

[56] References Cited

U.S. PATENT DOCUMENTS

| Re. 13,584 | 6/1913 | Van Norman | 82/37 |
|---|---|---|---|
| Re. 24,167 | 6/1956 | Chelf | 82/37 |
| 1,502,712 | 7/1924 | Chard | 82/36 R |
| 1,604,114 | 10/1926 | Drissner | 29/57 A |
| 1,678,924 | 7/1928 | Strindberg | 82/17 |
| 1,872,817 | 8/1932 | Root | 29/57 R |
| 2,089,078 | 8/1937 | Tyson | 82/12 |
| 2,391,878 | 1/1946 | Cassia | 82/36 R |
| 2,482,786 | 9/1949 | Mack | 82/5 |
| 2,610,535 | 9/1952 | Johnson | 82/23 |
| 2,841,039 | 7/1958 | Stastny | 82/24 R |
| 2,882,776 | 4/1959 | Jeanneret | 82/5 |
| 3,102,445 | 9/1963 | Elledge | 82/5 |
| 3,262,346 | 7/1966 | Spohn | 82/24 R |
| 3,320,840 | 5/1967 | Brekke | 82/37 |
| 3,680,416 | 8/1972 | Van Dijik | 82/36 R |
| 3,817,129 | 6/1974 | Nishimura et al. | 82/5 |

Primary Examiner—Leonidas Vlachos

[57] ABSTRACT

A cross slide turning tool holder has a body with a mounting post passing from top to bottom therethrough, the body having first and second members pivotally attached by the mounting post, the first member having "L" shape with a leg of the "L" horizontal below the second member and another leg of the "L" upright at an end of the second member and threadedly carrying a pair of screws bearing on the second member as angle adjusters, and adjustment block is carried in a dovetail in the second member with a portion extending into a groove where a spring laterally biases it, a roller has attachement for urging the adjustment block, which adjustment block has an upright dovetail structure slidably carrying a tool holding block which has a vertical adjustment setting provision. Embodiments provide for respective direct and reverse motion.

2 Claims, 4 Drawing Figures

CROSS SLIDE TURNING TOOL HOLDERS

This invention relates generally to machine tools and particularly to cross slide turning tools.

SUMMARY OF INVENTION

The tool holder of this invention will be mounted onto the front cross slide of an automatic screw machine, and will be brought into the work piece by the front cross slide cam, to a desired point, and stopped, then a pusher mounted onto the pick-up slotting attachment arm, operated by the cam that normally operates the pick-up arm, (made to suit the particular job being set-up), will push the plunger in the side of our tool holder to operate the horizonal movement of our tool. This combination can either straight or tapered diameters on parts being produced, and on manipulation of the two conventional automatic screw machine cams, can produce profiled parts with several turned diameters with high precision, and by using a turning action instead of a forming action can make parts with a much better finish, because there will be less tool contact with the metal and very little springing action from tool pressure.

DETAILED DESCRIPTION OF THE INVENTION

FIGS. 1 AND 2

Figure 1:
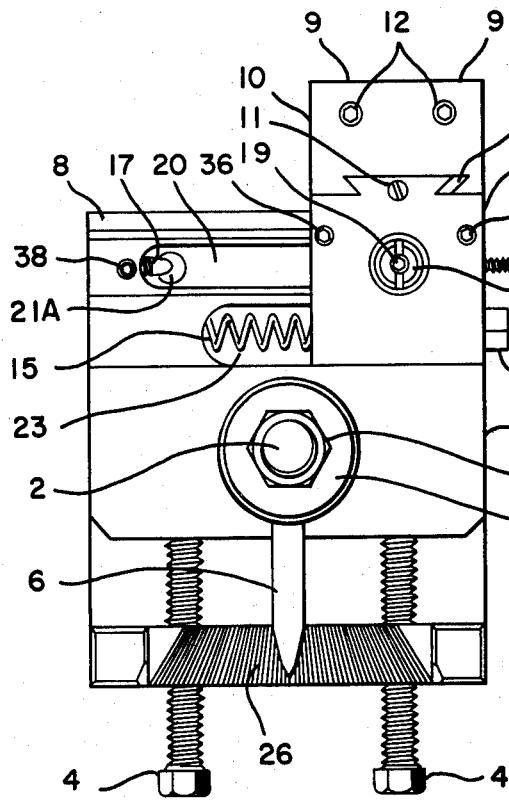
FIG. 1 is a plan view of a first embodiment.

The tool of this embodiment works from right to left the body 1, of tool holder will be mounted onto the front cross slide by means of the lock bolt 2, which also locks adjustment block 3, after desired setting by screws 4, which also are locked by set screws 5, located one on each side of holder 1, The desired setting of either straight or taper cutting action is visually seen by the pointer 6, fixed to the top of adjustment block 3, (centrally located), when the front cross slide cam of automatic screw machine raises the tool holder to desired position and stops on dwell cut into cam, then the pusher block mounted onto the pick-up slotting attachment arm presently on the machines, starts a longitudinal moving action governed by the pick-up slotting cam presently on machines, and comes into contact with pusher 7, of our invention, and moves at a rate of speed governed by the cam lay-out. The adjustment block 3, will move along dovetails 8, with a tool bit inserted into a hole 9, and locked by set screws 12, to cut the metal as desired. The tool holding block 10, is adjustable vertically, to adjust for height of tool bit to center, by means of a screw 11, which is through a pin inserted into face of tool holding block 10, and when the height is set, then the tool holding block 10, is locked by means of 3 set screws 13, against a gib 14, onto dovetail 8,. The tool holding block assembly 3, & 10, are returned to the starting position by a spring 15,. The tool holding block 10, & 3, when into its full stroke, (preset by height of cam), has a positive stop screw 16, which comes into contact with stop screw 17, (locked by set screw 38,) to control positive setting of tool bit. The positive stop screw 16, is through a vertical screw 18, (held set by set screw 37,) and locks, when set, by means of a set screw 19,. The horizonal milled out slots 20, are covered by three interlocking plates 35, which keep the slot covered at all times regardless of where tool holding block assembly 10, & 3, are positioned, in order to prevent chips or dirt from getting into slot 20, (set screws 36, hold the plates in adjustment). Seepage of cutting oil getting into slot 20, is drained out through two holes 21A, positioned one on each side of block 22,. The return spring 15, is covered by a plate fixed to block 22, for the above mentioned reasons of preventing chips and dirt from getting into spring well 23,. The pusher 7, has a roller 24, to allow for a smooth drive of the tool along the part being machined, and pusher 7, is locked onto block 3, by a nut 25, the roller 24, is positioned horizonally to tool holder 22,. The roller 24, is held in place by a 3/16 inch diameter pin 34, through, with a press fit into pusher 7, The taper is adjusted to graduations 26, to a maximum of 30° off each side of zero setting. The main block 1, is held to front cross slide by a square bottom 27, on post 2, and the block 22, & block 1, are locked together onto cross slide when nut 28, is tightened against washer 29, after setting is made, and the tool holding block assembly 3, & 10, is movable horizonally by above means. The tool is provided with a block, (not shown), to hold an internal boring tool bit that can be used to bore either straight or tapered holes.

FIGS. 3 AND 4

Figure 2:
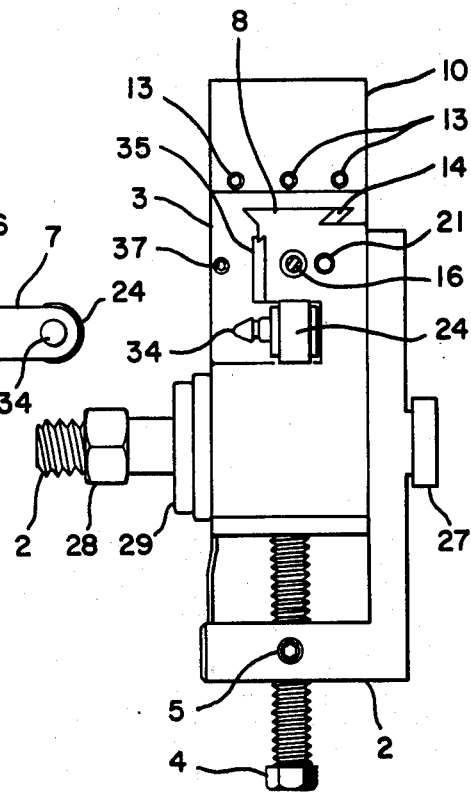
FIG. 2 is a side elevational view thereof.
Figure 3:
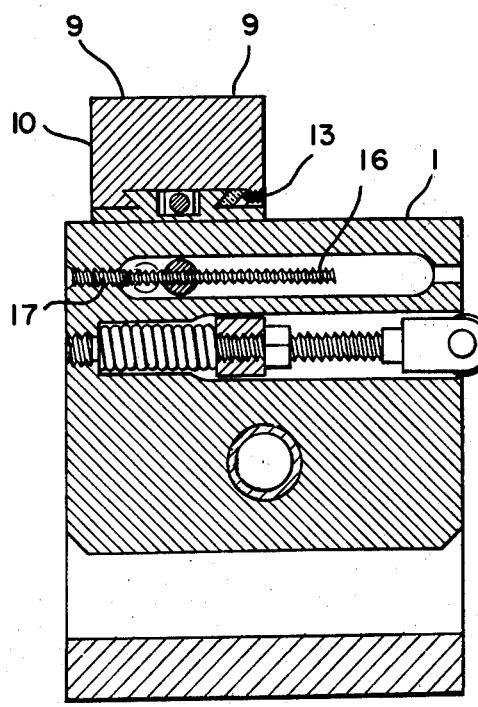
FIG. 3 is a plan view in partial section of a second embodiment.
Figure 4:
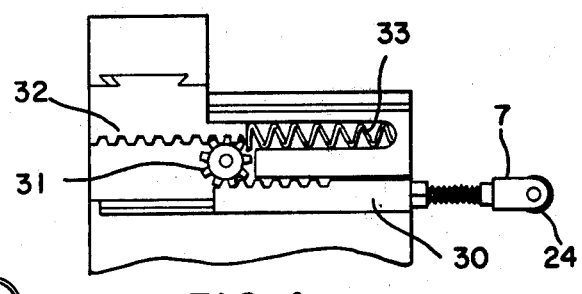
FIG. 4 is a plan detail thereof.

This embodiment (which is the subject of patent disclosure document number A445-1046) works almost indentically to the embodiment of FIGS. 1 and 2, except it works from left to right and is operated by a plunger 7, with a rack 30, built onto 7, and working into a pinion 31, which pulls rack 32, from left to right, providing a cutting action starting at spindle side, and moving toward end of part being machined, either straight or tapered, same as the embodiment of FIGS. 1 and 2, but in addition can cut "0"-ring grooves into the back side of a shoulder on the part being made, eliminating a lot of secondary machine work on some parts. Each tool is 4¾ long by 3½ wide by 2 inches high, overall measurements of the tools of both embodiments, above. Each tool is made of type C1018 steel, case hardened to a rockwell C 35–40 for wearability. (Throughout). Both tool embodiments are capable of performing knurling operations as well as machining of parts, and each tool has a 2 inch longitudinal stroke.

We claim:
1. A cross slide turning tool holder comprising: a body having a top and a bottom, the body structure defining an aperture therethrough from top to bottom, a mounting post through the aperture and terminating in a square lower end for mounting and a threaded upper end for tightening, the body comprising first and second members pivotally attached by the mounting post, the first member having an "L" shape with a horizontal leg and an upright leg, the horizontal leg of the "L" shape below the second member and the upright leg spaced from a first end of the second member, first and second screws threadedly engaging the second leg and extending against the first end of the second member for adjusting the angular position of the second member, the second member structure defining a groove in the top thereof and a dovetail way laterally across a second end thereof, an adjustment block having complementary way structure slidably received on said dovetail way, a portion of the adjustment block extending downward into said groove, resilient means in the groove biasing laterally said portion of the adjustment block; a threadedly adjustable roller, for urging said adjustment block, on said portion of the adjustment block generally parallel with said resilient means, a solid stop adjustment screw on said adjustment block, the adjustment block having an upright dovetail structure, and a tool holding block with a complementary dovetail structure slidably engaging said dovetail structure, and means for vertically setting the position of said tool holding block.

2. A cross slide turning tool holder as recited in claim 1, and a rack and pinion having association with the second member for reversing the direction of motion of the adjustment block upon urging by said roller.

* * * * *